US012689513B2

(12) United States Patent
Shetty et al.

(10) Patent No.: US 12,689,513 B2
(45) Date of Patent: Jul. 21, 2026

(54) LEVERAGING USER'S VIRTUAL INTERACTIONS TO INFLUENCE PREFERRED MESSAGE COMMUNICATION TIMING

(71) Applicant: INTERNATIONAL BUSINESS MACHINES CORPORATION, Armonk, NY (US)

(72) Inventors: Shilpa Shetty, Sydney (AU); Jignesh Karia, Thane (IN); Pankaj Satyanarayan Dayama, Bangalore (IN); Mukundan Sundararajan, Bangalore (IN); Neha Shah, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 18/530,734

(22) Filed: Dec. 6, 2023

(65) Prior Publication Data

US 2025/0193007 A1     Jun. 12, 2025

(51) Int. Cl.
*H04L 9/32*       (2006.01)
*G06T 17/00*     (2006.01)

(52) U.S. Cl.
CPC ............ *H04L 9/3213* (2013.01); *G06T 17/00* (2013.01)

(58) Field of Classification Search
CPC ............................. H04L 9/3213; G06T 17/00
See application file for complete search history.

(56) References Cited

U.S. PATENT DOCUMENTS

| | | | | |
|---|---|---|---|---|
| 6,476,830 | B1 * | 11/2002 | Farmer | G06Q 30/0641 |
| | | | | 715/977 |
| 9,621,768 | B1 * | 4/2017 | Lyon | H04N 21/47 |
| 10,497,033 | B2 | 12/2019 | Sutton-Shearer | |

(Continued)

FOREIGN PATENT DOCUMENTS

| | | | | |
|---|---|---|---|---|
| CA | 3039347 | A1 * | 4/2018 | G06T 19/003 |
| CN | 106020045 | A * | 10/2016 | G06K 7/0008 |

(Continued)

OTHER PUBLICATIONS

Tanaka et al, Detecting Dementia Through Interactive Computer Avatars, Sep. 2017, IEEE, pp. 1-11. (Year: 2017).*

*Primary Examiner* — Abu S Sholeman
(74) *Attorney, Agent, or Firm* — Seed Intellectual Property Law Group LLP

(57)                ABSTRACT

A computer-implemented method may include linking a user's virtual interaction data with a service or product to a virtual token; determining that the virtual token is associated with a user that provided consent to link a virtual avatar to a user's real-world computing device anonymously via TSP scrubbing; linking the virtual avatar to the user's real-world computing device anonymously; determining competitive recency, frequency, and time analysis (CRFT) based on the user's virtual interaction data with the service or product via the virtual avatar; determining, based on the CRFT metrics, a match between the virtual token and the service or product; and communicating to an entity associated with the service or product of a determination of the match between the virtual token and the service or product based on the CRFT metrics.

18 Claims, 6 Drawing Sheets

(56) References Cited

U.S. PATENT DOCUMENTS

| | | | | |
|---|---|---|---|---|
| 2009/0044113 A1* | 2/2009 | Jones | G06T 13/40 | |
| | | | | 715/707 |
| 2010/0070859 A1* | 3/2010 | Shuster | G06T 17/00 | |
| | | | | 715/706 |
| 2011/0301760 A1* | 12/2011 | Shuster | G06F 3/04815 | |
| | | | | 700/264 |
| 2012/0095999 A1* | 4/2012 | Donde | G06F 16/3329 | |
| | | | | 707/E17.084 |
| 2017/0148082 A1* | 5/2017 | Murahari | G06Q 30/0643 | |
| 2018/0121965 A1 | 5/2018 | Greenberger et al. | | |
| 2018/0232756 A1* | 8/2018 | Greene | G06Q 30/0231 | |
| 2018/0302436 A1* | 10/2018 | Williamson | H04L 63/205 | |
| 2018/0350144 A1 | 12/2018 | Rathod | | |
| 2019/0129730 A1* | 5/2019 | Chen | H04L 67/53 | |
| 2020/0090324 A1* | 3/2020 | Li | G10L 25/60 | |
| 2020/0272981 A1* | 8/2020 | Kirkegaard | H04L 63/0428 | |
| 2020/0380457 A1 | 12/2020 | Soon-Shiong | | |
| 2022/0107681 A1* | 4/2022 | Ronnau | G06T 19/20 | |
| 2023/0013539 A1* | 1/2023 | Holland | G06T 7/73 | |
| 2023/0360156 A1* | 11/2023 | Paracha | G06Q 50/18 | |
| 2024/0048780 A1* | 2/2024 | Zhang | H04N 21/47205 | |
| 2024/0103614 A1* | 3/2024 | Dryer | G06F 3/0482 | |
| 2024/0185515 A1* | 6/2024 | Chen | G06T 17/00 | |
| 2025/0104341 A1* | 3/2025 | Yarabolu | G06F 3/012 | |

FOREIGN PATENT DOCUMENTS

| | | | | |
|---|---|---|---|---|
| EP | 2624238 B1 * | 4/2020 | | G09B 9/307 |
| KR | 20180121965 | 11/2018 | | |
| WO | WO-2015139231 A1 * | 9/2015 | | G06V 40/176 |

* cited by examiner

Figure 1:
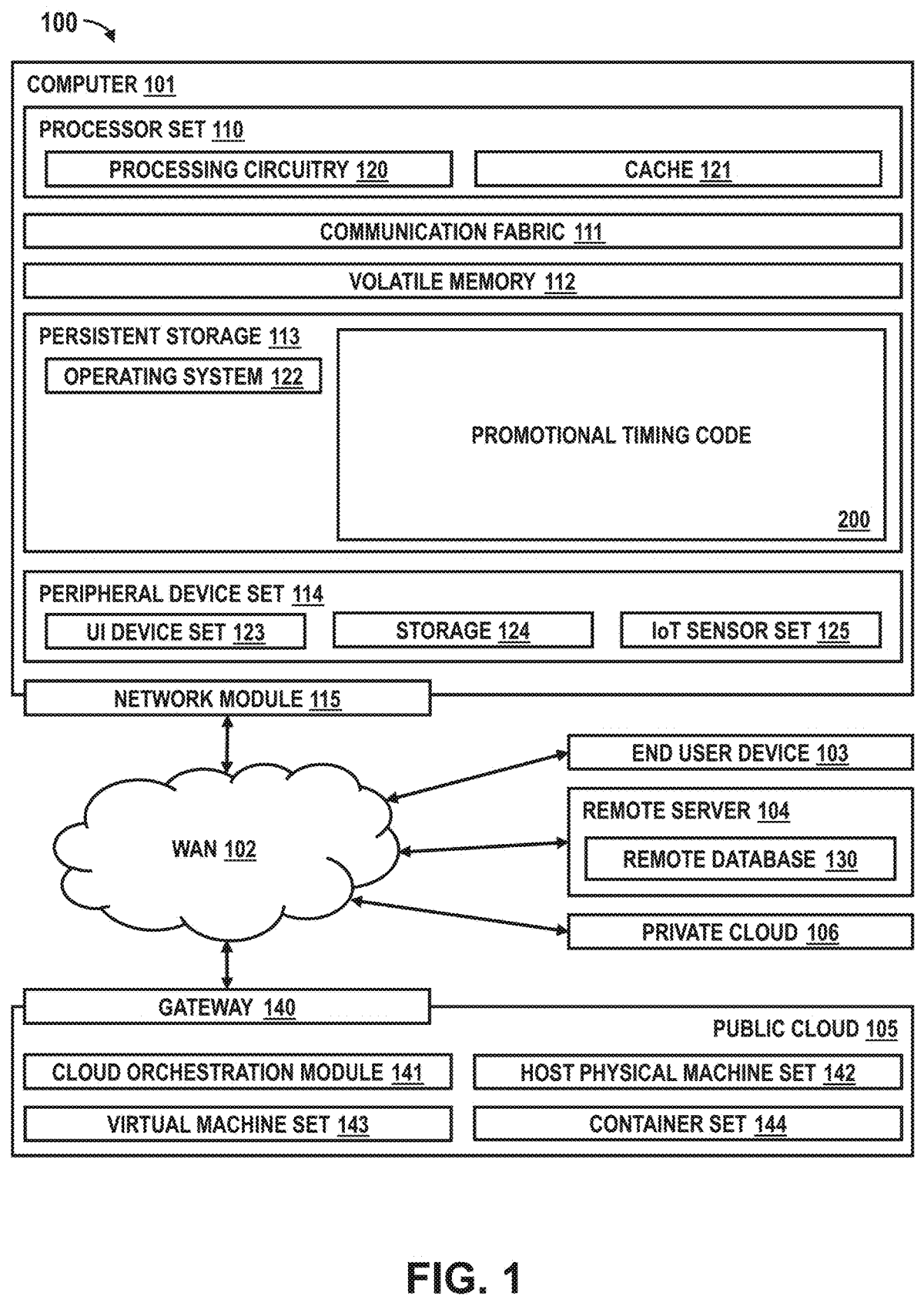

100

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

PROMOTIONAL TIMING CODE

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

PROMOTIONAL TIMING SERVER
240

CRFT ANALYSIS
MODULE
210

SCRUBBING
MODULE
212

224

220

303

230

| Customer | Recency Value for CS | Frequency Value for CS | Time Value for CS | Recency Value for CS | Frequency Value for CS | Time Value for CS |
|----------|------|------|------|------|------|------|
| 402 | 404 | 406 | 408 | 410 | 412 | 414 |
| #1 | | | | | | |
| #2 | | | | | | |
| ... | | | | | | |

| Customer | Net Score | Segment |
|----------|-----------|---------|
| 402 | 422 | 424 |
| #1 | 5-2-4 | Potential Customer |
| #2 | 1-1-1 | Lost Customer |
| ... | 5-5-5 | Loyalist |

| Score | Relative Recency Value | Relative Frequency Value | Relative Time Value |
|-------|------|------|------|
| 413 | 416 | 418 | 420 |
| #1 | (C1>=C4) && 30< C1<35 | (C2>=C5) && 0< C2<2 | (C3>=C6) && C3<15 |
| #2 | | | |
| ... | (C1<C4)&&C1<7 | (C2>C5)&&C2>5 | (C3>C6)&&C3>C6 |

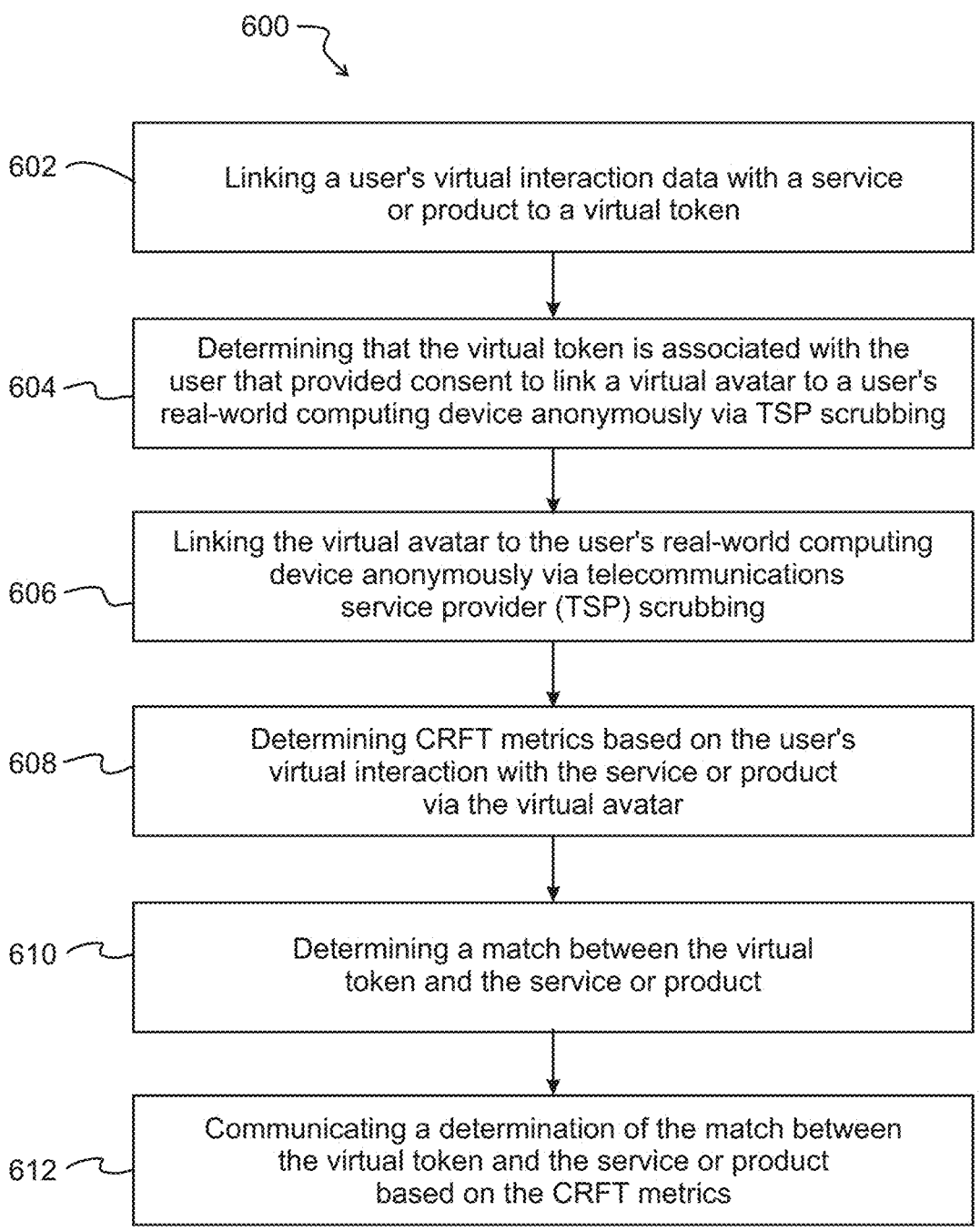

600

602 — Linking a user's virtual interaction data with a service or product to a virtual token 604 — Determining that the virtual token is associated with the user that provided consent to link a virtual avatar to a user's real-world computing device anonymously via TSP scrubbing 606 — Linking the virtual avatar to the user's real-world computing device anonymously via telecommunications service provider (TSP) scrubbing 608 — Determining CRFT metrics based on the user's virtual interaction with the service or product via the virtual avatar 610 — Determining a match between the virtual token and the service or product 612 — Communicating a determination of the match between the virtual token and the service or product based on the CRFT metrics

FIG. 6

LEVERAGING USER'S VIRTUAL INTERACTIONS TO INFLUENCE PREFERRED MESSAGE COMMUNICATION TIMING

BACKGROUND

Aspects of the present invention relate generally to systems and methods of linking online user avatar activity to real-world message communication and delivery.

Brands or entities may utilize varied means to reach existing customers, increase interaction with existing customer bases, and reach potential customers. For example, brands or entities may reach customers directly via promotional messaging, such as via short messaging services (SMS), or via traditional advertising displays in public or private spaces. Target customers may be defined by their preferences provided to a brand or entity or based on customer preferences retrieved by the brand or entity after receiving consent from a customer, such as is the case in e-commerce shopping or virtual immersive worlds. In virtual worlds, individual users may be represented as an avatar functioning as a virtual representation of the user.

SUMMARY

In a first aspect of the invention, there is a computer-implemented method including: linking a user's virtual interaction data with a service or product to a virtual token; determining that the virtual token is associated with a user that provided consent to link a virtual avatar to a user's real-world computing device anonymously via TSP scrubbing; linking the virtual avatar to the user's real-world computing device anonymously; determining competitive recency, frequency, and time analysis (CRFT) based on the user's virtual interaction data with the service or product via the virtual avatar; determining, based on the CRFT metrics, a match between the virtual token and the service or product; and communicating to an entity associated with the service or product of a determination of the match between the virtual token and the service or product based on the CRFT metrics.

In another aspect of the invention, there is a computer program product including one or more computer readable storage media having program instructions collectively stored on the one or more computer readable storage media. The program instructions are executable to: link a user's virtual interaction data with a service or product to a virtual token; determine that the virtual token is associated with a user that provided consent to link a virtual avatar to a user's real-world computing device anonymously via telecommunications service provider (TSP) scrubbing; link the virtual avatar to the user's real-world computing device; determine competitive recency, frequency, and time analysis (CRFT) metrics based on the user's virtual interaction data with the service or product via the virtual avatar; determine, based on the CRFT metrics, a match between the virtual token and the service or product; and communicate to an entity associated with the service or product a determination of the match between the virtual token and the service or product based on the CRFT metrics.

In another aspect of the invention, there is a system including a processor set, one or more computer readable storage media, and program instructions collectively stored on the one or more computer readable storage media. The program instructions are executable to: link a user's virtual interaction data with a service or product to a virtual token;

determine that the virtual token is associated with a user that provided consent to link a virtual avatar to a user's real-world computing device anonymously via telecommunications service provider (TSP) scrubbing; link the virtual avatar to the user's real-world computing device; determine competitive recency, frequency, and time analysis (CRFT) metrics based on the user's virtual interaction data with the service or product via the virtual avatar; determine, based on the CRFT metrics, a match between the virtual token and the service or product; and communicate to an entity associated with the service or product a determination of the match between the virtual token and the service or product based on the CRFT metrics.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 6 shows a flowchart of a computer-implemented method in accordance with aspects of the present invention.

DETAILED DESCRIPTION

Figure 2:
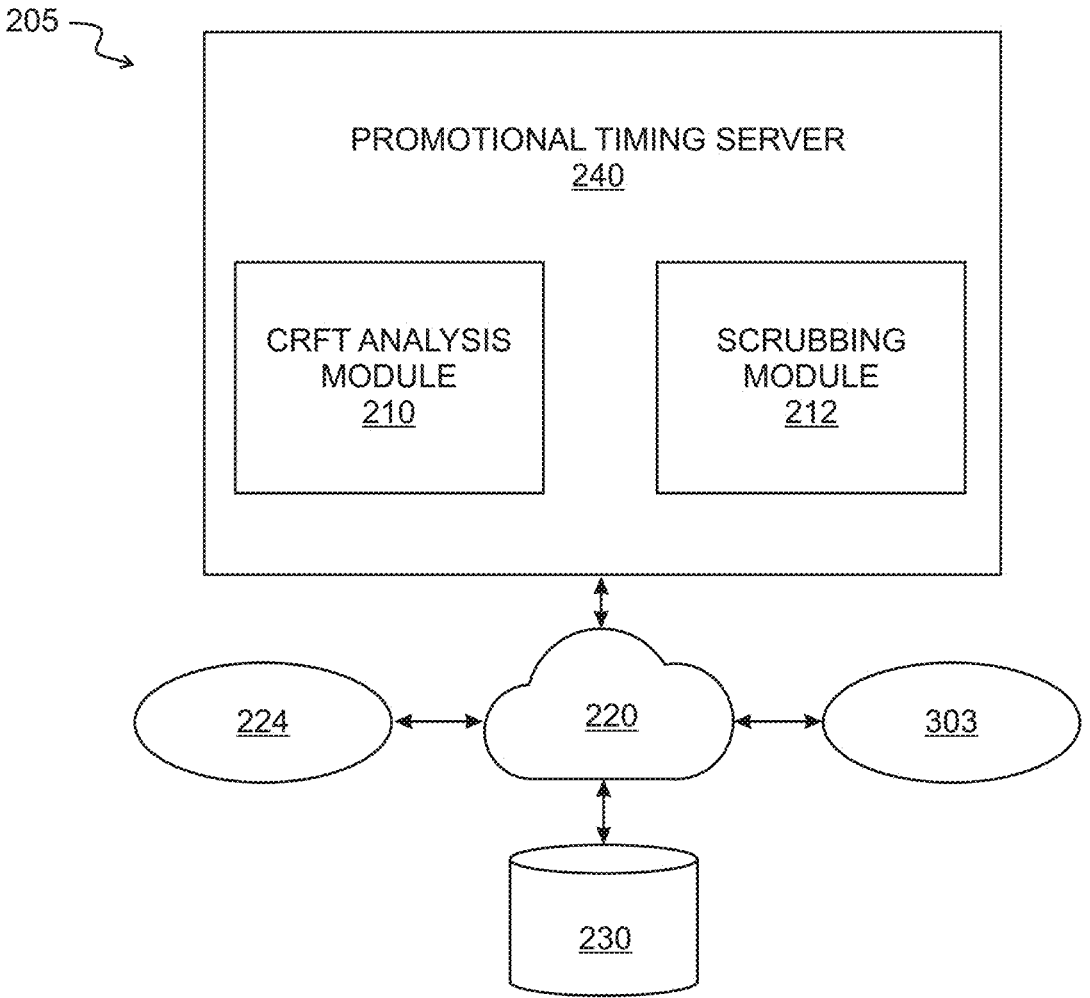
FIG. 2 shows a block diagram of an exemplary environment in accordance with aspects of the present invention.

Aspects of the present invention relate generally to utilizing user(s) virtual interactions to influence real-world promotion timing and, more particularly, to delivering promotional messaging based on competitive recency, frequency, and time analysis (CRFT). According to aspects of the invention, a system or method may link user virtual interactions to real-world user data such that promotional messaging, such as service and product advertisements, may be delivered to a user, such as on a smart device, in a timely manner. The system may utilize data telecommunications service provider scrubbing techniques to maintain confidentiality between user virtual interactions and real-world interactions.

Real-world branding and advertising services seek out varied means to reach desired customers, increase interaction with existing customers, and engage with prospective customers. The manner in which advertising is delivered to target customers may include promotional messaging, such as SMS, public advertisements, or advertising in private spaces. In some instances, target consumers may provide consent or "opt-in" to receive specific, targeted advertisements or offers.

Similarly, branding and advertising services in virtual settings seek out varied means to reach desired new customers, increase interaction with existing customers, and engage with prospective customers. Advertising in a virtual setting may be delivered to a user by serving advertisements to a user avatar, i.e., a virtual representation of the real-world individual interacting in an online or virtual setting.

Linking real-world advertising to online or virtual avatar activity allows branding and advertising services to increase effective reach to preferred customers in the real world while allowing users participating in a virtual world via their avatar to be informed about brands' services or products with which they have a preference in the real world. In particular, determining and properly timing the delivery of promotional messaging, including advertisements, may maximize the effectiveness of messaging and the receptiveness of the individual receiving the message.

It should be understood that, to the extent implementations of the invention collect, store, or employ personal information provided by, or obtained from, individuals (for example, users interacting in a virtual or online setting), such information shall be used in accordance with all applicable laws concerning the protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a system may be configured to monitor or collect virtual interaction data of a user, such as user preferences, location, and service or product interaction and usage. As a non-limiting example, a user interacting with a virtual world, such as a "metaverse" i.e., a virtual world beyond, layered on top of, or as an extension of the real world, may interact with a virtual representation of a real-world entity, such as a specific restaurant. The real-world restaurant may be represented virtually within a metaverse in a number of ways, including, but not limited to, virtual advertisements, 2-D or 3-D models, audial or visual representations, and the like.

In embodiments, a system may be configured to: create a ranked or curated list for promotional messages using dynamic CRFT analysis in both the real and virtual world; consider user's interactions of an avatar in a metaverse world combined with a registered preferred brand, time window, and dynamic threshold for different customer segments for dynamic segmentation logic; link the interactions of a user's avatar in the virtual world with their online preference and virtual interactions to create a curated list of promotional messages; create CRFT metrics by adding user's interactions with a brand's service or product in the virtual world; provide an anonymously updated customer preference based on their virtual interactions; provide scrubbing as a service that would return a list of virtual tokens based on the budget and CRFT metrics for the user for a given brand or entity; and enhance the scrubbing service to time the preferred brand's offer to a user based on the CRFT metrics.

In embodiments, the system may be configured to link a user's virtual interaction data to a user's real-world telecommunications or smart device, such as a smartphone. As a non-limiting example, a user i may register a virtual avatar Ai1 or a plurality of virtual avatars (Ai2, Ai3, . . . . Ain) in a single metaverse or a plurality of metaverses on a blockchain. Blockchains may include shared databases that store data in blocks linked to one another via cryptography across multiple databases. Virtual avatars Ai1 may be registered at time t1 (or t2, t3, . . . tn) and be linked to a virtual token Vi1 (or Vi2, Vi3, . . . . Vin) which may correspond to the real-world, public identity of the user digitally interacting via an avatar. In embodiments, user i has provided consent to permit the system to link virtual avatar Ai1 and Vi1 anonymously via TSP scrubbing, described below.

In embodiments, the system may be configured to receive as input category-based service or product preferences of a plurality of users stored on a blockchain, such as an unsolicited commercial communication-compliant (UCC) blockchain. User category-based preferences may include: data relating to interactions of an avatar in a metaverse; preferred user service or products registered for receiving promotional messaging; and preferred promotional messaging time windows. The system may be configured to output at least a list of users to target for promotional messaging with corresponding timing constraints based on CRFT metrics.

The system may be configured to query a scrubbing service of a telecommunications service provider (TSP) on a UCC-compliant blockchain network in the real world including providing a list of virtual tokens, such as Vi1, Vi2, Vi3, . . . . Vin, with corresponding service or product entities that a specific user associated with a specific virtual token has interacted with within a virtual world. The system may also determine that the user corresponding to the virtual token has provided opt-in consent for the targeted service or product entity. Where a user has provided opt-in consent, the system may perform CRFT analysis and segmentation of users. The system may also notify the service or product entity having registered promotional activity criteria of matching virtual tokens based on the CRFT analysis. The system may communicate lists of virtual tokens and associated promotional messaging to a UCC-compliant blockchain. During these processes, the system may be configured to enhance TSP scrubbing services, such as identifying or removing personal protected information (PPI) or illegal or fraudulent network traffic to maintain anonymity between a user's real-world interactions and virtual interactions.

TSP scrubbing may include techniques such as, but not limited to, fraud detection, traffic analysis, filtering and blocking, compliance, revenue assurance, or network security to identify and remove PPI while maintaining anonymity between a user's real-world interactions and virtual interactions.

In embodiments, the system may be configured to perform CRFT analysis and determine CRFT metrics based on a user's virtual interactions. CRFT metrics may include target timing metrics, which may be determined to instruct brand entities on more opportune timing of the communication of promotional messaging. In embodiments, virtual interactions may also be linked to user-identified promotional or advertising preferences, such as specific brands, timing of promotional messaging, or the like. CRFT metrics may be updated, via TSP scrubbing, as user virtual interactions are monitored.

CRFT analysis and metrics may monitor, track, and store virtual interactions of users based on preferred service or product virtual or real-world interaction recency, frequency, and timing. Similarly, CRFT analysis and metrics may monitor, track, and store virtual interactions of users based on competitor-brand (brands competing with the preferred brand) virtual or real-world interaction recency, frequency, and timing. Brand-specific CRFT metrics may be analyzed to score or segment users and customers based on relative virtual or real-world brand interaction recency, frequency, and timing to identify loyal customers, potential customers, lost customers, or the like. The system may be configured to communicate a notification to a brand entity if the number of identified customers having brand-specific CRFT metrics is above a predetermined threshold and share the virtual tokens associated with the identified customers with the brand entity. In embodiments, the system may be configured to communicate a notification to a brand entity based on target timing metrics, for example, timed messaging to increase effectiveness, such that promotional messaging may be communicated at advantageous times, such as communicating promotional messaging relating to restaurants at times corresponding to users' virtual interactions with restaurants in a metaverse or at times corresponding to popular or known times when a user may become hungry, such as approximate times of breakfast, lunch, or dinner. The system may be configured to distribute promotional messaging to the users associated with the virtual tokens having brand-specific CRFT metrics above a predetermined threshold.

Figure 4A:
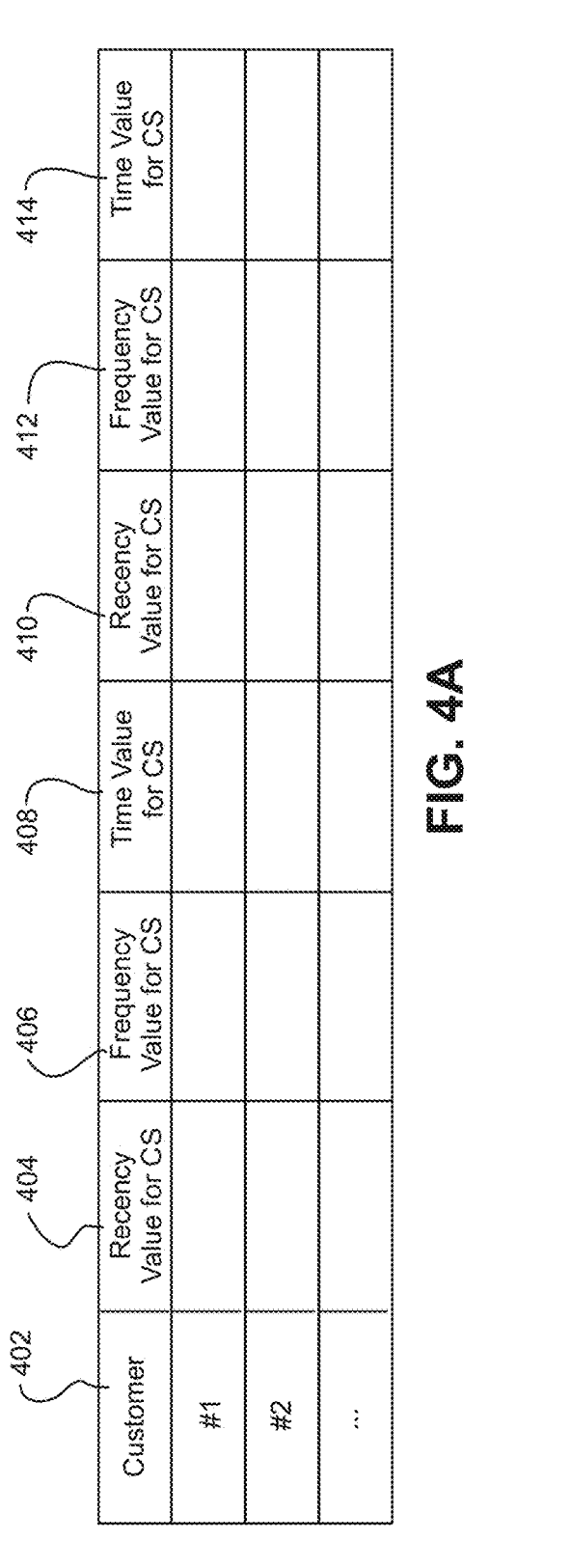
FIG. 4A shows a table of a method of determining CRFT metrics in accordance with aspects of the present invention.
Figure 4B:
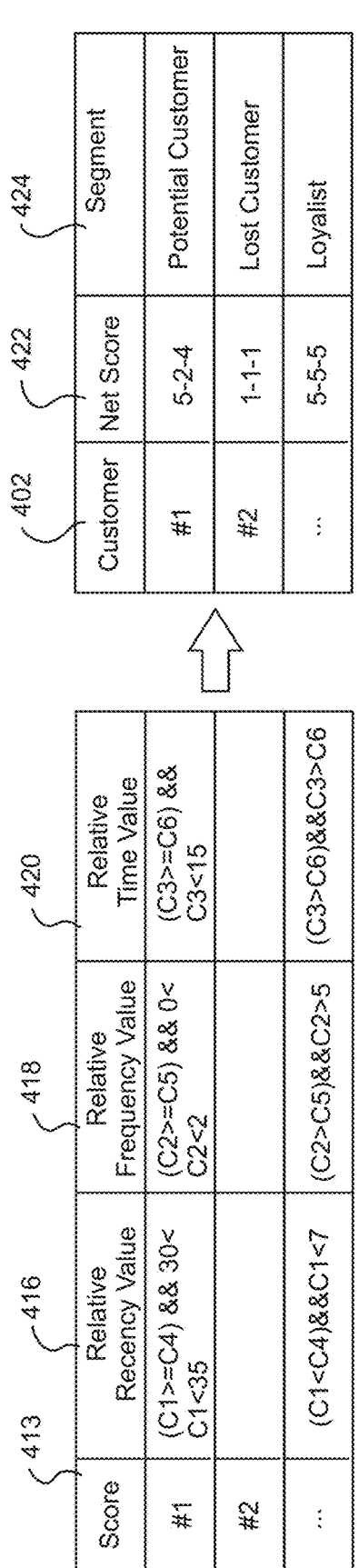
FIG. 4B shows a table of a method of determining CRFT metrics in accordance with aspects of the present invention.

User segmentation may include tracking and determining CRFT metrics per customer to determine a score per customer, as depicted in FIGS. 4A and 4B. Relative scores may be tabulated into a net score per customer in order to segment customers into categories such as, but not limited to, loyal customers, potential customers, and lost or disinterested customers.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

Referring to FIG. 1, a computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as promotional timing code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. In embodiments, the environment includes promotional timing server 240, corresponding to computer 101 as in FIG. 1, including or in communication with CRFT analysis module 210 and a scrubbing module 212 both corresponding to promotional timing code of block 200, as in FIG. 1. The promotional timing server 240 includes or is in communication with the CRFT analysis module 210 and a scrubbing module 212 for performing CRFT metric determination, CRFT analysis, communication scrubbing, and communicating brand-preference and promotional timing information to a brand entity computer device 224. The environment 205 includes at least one database 230 in operable communication with the promotional timing server 240 over network 220, corresponding to WAN 102 of FIG. 1. The database 230, corresponding to remote server 104 or remote database 130 of FIG. 1, may store service or product data, virtual avatar data, virtual interaction data, user data, CRFT metrics, among other things. Consumer user device 303, corresponding to end user device 103 of FIG. 1, may be in operable communication with the promotional timing server 240 over the network 220, to allow users to opt-in to promotional messaging.

In embodiments, the promotional timing server 240 of FIG. 2 includes or is in communication with CRFT analysis module 210 and a scrubbing module 212, each of which may include modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The promotional timing server 240 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
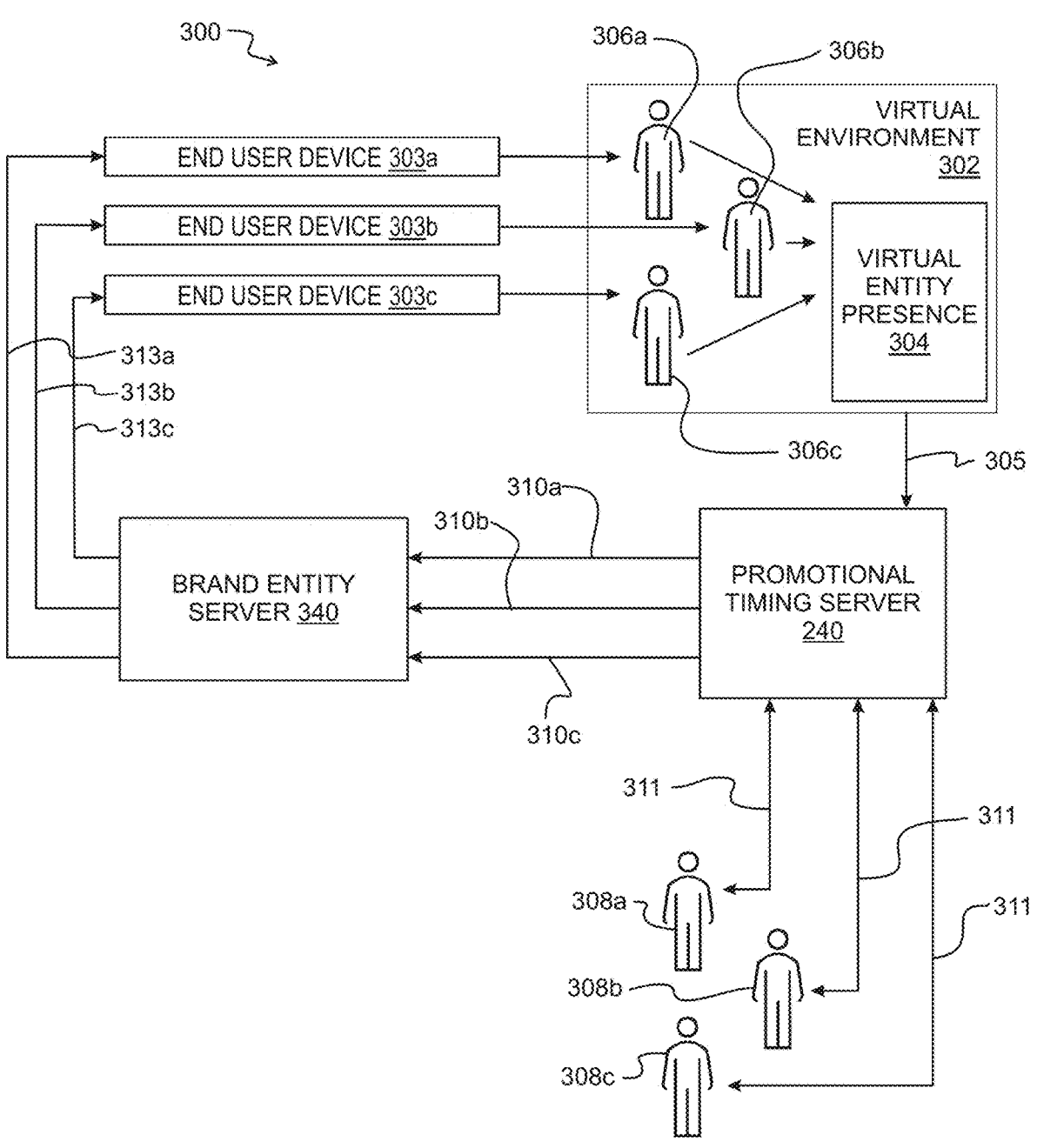
FIG. 3 shows a flowchart of a computer-implemented method in accordance with aspects of the present invention.

FIG. 3 shows a flowchart of an exemplary computer implemented method in accordance with aspects of the present invention. Steps of the method may be carried out in the environment of FIG. 2 and are described with reference to elements depicted in FIG. 2. In a virtual environment 302, such as a metaverse, users 308a, 308b, and 308c may provide user input 311 to promotional timing server 240, as described with respect to FIG. 2. Users 308a, 308b, and 308c may provide user input 311 that may include category-based service or product preferences and consent to allow the computer-implemented method 300 to link a virtual avatar 306a, 306b, and 306c to a virtual token 305, and a user's real-world computing device 303a, 303b, 303c, respectively. Virtual avatars 306a, 306b, and 306c associated with users 308a, 308b, and 308c may interact with virtual entity presence 304. Virtual entity presence 304 may include virtual advertisements, 2-D or 3-D models, audial or visual representations, or the like. Virtual avatars' 306a, 306b, and 306c interactions with virtual entity presence 304 may be tracked and communicated to the promotional timing server 240. The promotional timing server 240 may calculate CRFT metrics relative to each virtual avatars' 306a, 306b, and 306c interactions with virtual entity presence 304 and compare relative CRFT metrics 310a, 310b, and 310c to predetermined threshold values. CRFT metrics 310a, 310b, and 310c may be periodically updated based on additional virtual interactions of the virtual avatar with the service or product. In response to the calculation of relative CRFT metrics 310a, 310b, and 310c, the method may generate a ranked list of promotional messaging based on relevance to the CRFT metrics 310a, 310b, and 310c; generate a curated list of promotional messaging based on a match between the virtual token 305 and a service or product based on the relative CRFT metrics 310a, 310b, and 310c; or generate target timing metrics, for example, timed messaging to increase effectiveness, for timed communication of promotional messaging based on relative CRFT metrics 310a, 310b, and 310c. Relative CRFT metrics may be periodically updated based on additional virtual interactions of the virtual avatars 306a, 306b, and 306c with virtual entity presence 304. In response to CRFT metrics 310a, 310b, and 310c crossing predetermined threshold values, the method may communicate the crossing of predetermined threshold values to a brand entity server 340, corresponding to entity computer device 224 in FIG. 2, or may notify an entity associated with the virtual entity presence of the user score above a predetermined threshold and distribute messaging, such as SMS, to the user's real-world computing device associated with the user score above the predetermined threshold. In embodiments, communicating the crossing of predetermined threshold values to a brand entity server 340 may include communicating a priority list of users to receive promotional messaging based on CRFT metrics. Brand entity server 340 may communicate promotional messaging 313a, 313b, and 313b to the user devices 303a, 303b, and 303c, of respective users 308a, 308b, and 308c.

FIG. 4A shows a table of a method of determining CRFT metrics, determined via CRFT analysis module 210 as in FIG. 2 and depicted as 310a, 310b, and 310c in FIG. 3, in accordance with aspects of the present invention. The method may include tracking recency values 404, frequency values 406, and time values 408 per customer 402 for virtual interactions with a particular service or product. The method may also include tracking competitor recency values 410, competitor frequency values 412, and competitor time values 414 for virtual interactions with a competitor service or product. The service or product, for example, may be a particular restaurant and the competitor service or product(s) may be other restaurants or food services in competition with the service or product. CRFT metrics for brands and competitor brands may be tracked and compared relative to individual customers to identify preferred promotional messaging or advertising based on virtual interaction recency values 404, frequency values 406, and time values 408 per customer 402. FIG. 4B shows a table of a method of determining CRFT metrics based on virtual interactions of the virtual avatar with the service or product, determined via CRFT analysis module 210 as in FIG. 2 and depicted as 310a, 310b, and 310c in FIG. 3, in accordance with aspects of the present invention. The method may include tracking relative recency values 416, relative frequency values 418, and relative time values 420 per customer 402 to determine a score 413 per value 416, 418, and 420 per customer 402, as depicted in FIG. 4A. The method may include tracking recency values 416 of virtual interactions between a virtual avatar and a virtual entity presence, tracking frequency values 418 of virtual interactions between a virtual avatar and a virtual entity presence, and tracking time values 420 of virtual interactions between a virtual avatar and a virtual entity presence. Relative scores may be tabulated into a net score 422 per customer 402 in order to segment 424 customers into categories such as, but not limited to, loyal customers, potential customers, and lost or disinterested customers.

Figure 5:
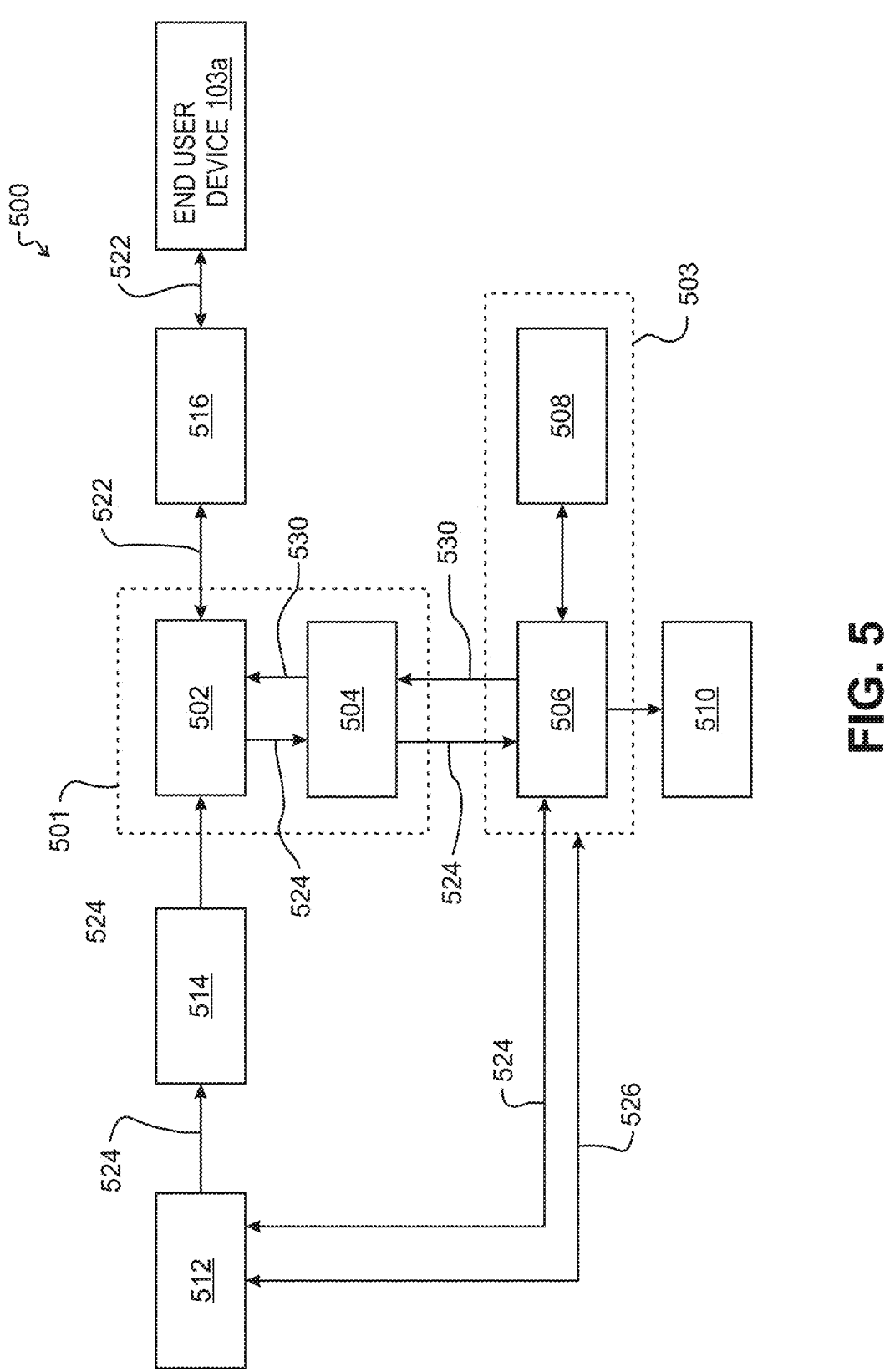
FIG. 5 shows a flowchart of a computer-implemented method in accordance with aspects of the present invention.

FIG. 5 shows a flowchart of a computer-implemented method in accordance with aspects of the present invention. A method of enhanced TSP scrubbing 500 may be performed in conjunction with the promotional timing server 240, CRFT analysis module 210, and scrubbing module 212 depicted in FIG. 2. In embodiments, a brand entity server 512, depicted as brand entity server 340 in FIG. 3, may share a list of virtual avatar IDs 526 and hash preimages as proof of interaction of a virtual avatar in a metaverse with a registered telemarketer 514 to facilitate sending promotional messaging 522. Telemarketer 514 may submit the list of virtual avatar IDs and proof of virtual interaction to an originating access provider mobile switching center 502 of a voice provider 501 that maintains consent data on a distributed ledger 506 maintained by a telecommunications operator. An enhanced scrubbing process may be performed to check the registration and correctness of virtual avatar IDs 526 and hash preimages and return consent tokens 524 for mobile numbers corresponding to the virtual avatar ID that provided consent to receive a particular type of promotional messaging 522. The consent token may be a 10-digit virtual number, for example and without limitation. The telemarketer may submit consent tokens 524 along with promotional messages to an originating access provider mobile switching center 502. Originating access provider mobile switching center 502 may be in operable communication with a do-not-disturb module 504 for ensuring that promotional messaging is not communicated to users who have opted out. The original access provider mobile switching center 502 may retrieve the mobile number (or mobile station international subscriber directory number (MSISDN)) 530 from a database 510 of the user associated with the virtual avatar ID from a distributed ledger network 503 including original access provider distributed ledger 506 and terminating access provider distributed ledger 508. The MSISDN 530 may be used to communicate promotional messaging 522, including ranked listings of promotional messaging, lists of matched virtual tokens and services or products, curated lists of promotional messaging, or priority lists of users to receive promotional messaging as referred to in the description of FIG. 3, to a terminating access provider mobile switching center 516 and subsequently communicate promotional messaging 522 to an end user device 103. FIG. 6 shows a flowchart of a computer-implemented method 600 including linking 602 a user's virtual interaction data with a service or product to a virtual token and determining 604 that the virtual token is associated with a user that provided consent to link a virtual avatar to a user's real-world computing device anonymously via TSP scrubbing. The method may further include linking 606 the virtual avatar to the user's real-world computing device anonymously via TSP scrubbing, which may include querying a scrubbing service of a TSP on a blockchain network including communicating the virtual token and at least one virtual interaction with the service or product to the entity and determining that the virtual token is associated with the user that provided consent to link the virtual avatar and the user's real-world computing device anonymously via TSP scrubbing with respect to the service or product. The method may further include determining 608 CRFT metrics based on a user's at least one virtual interaction with the service or product via the virtual avatar. The method may include determining 610 a match between the virtual token and the service or product, such as determining a user score based on relative interactions between the virtual avatar and the virtual entity presence based on the recency of virtual interactions, the frequency of virtual interactions, and the timing of virtual interactions; and communicating 612 to an entity associated with the service or product of a match between the virtual token and the service or product, such as a list or ranked list of matched virtual tokens and services and products, based on the CRFT metrics. In embodiments, the method may include communicating a priority list of users to receive messaging based on CRFT metrics.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of (1) installing program code on a computing device, such as the computer 101 of FIG. 1, from a computer-readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a processor set, a user's virtual interaction data with a service or product as input from a user, the user's virtual interaction data comprising data related to usage of the service or product;
   linking, by the processor set, the user's virtual interaction data with the service or product to a virtual token;
   determining, by the processor set, that the virtual token is associated with the user that provided consent to link a virtual avatar to a user's real-world computing device anonymously via telecommunications service provider (TSP) scrubbing;
   linking, by the processor set, the virtual avatar to the user's real-world computing device;
   determining, by the processor set, competitive recency, frequency, and time analysis (CRFT) metrics based on the user's virtual interaction data with the service or product via the virtual avatar, wherein determining the CRFT metrics comprises:
   tracking recency of virtual interactions between the virtual avatar and a virtual entity presence;
   tracking frequency of virtual interactions between the virtual avatar and the virtual entity presence; and
   tracking timing of virtual interactions between the virtual avatar and the virtual entity presence;

determining, by the processor set and based on the CRFT metrics, a match between the virtual token and the service or product; and
   communicating, by the processor set and to an entity associated with the service or product, a determination of the match between the virtual token and the service or product based on the CRFT metrics.

2. The computer-implemented method as in claim 1, further comprising generating a list of matched virtual tokens and service or products.

3. The computer-implemented method as in claim 1, further comprising generating a ranked list of messages.

4. The computer-implemented method as in claim 3, wherein generating the ranked list of messages comprises generating a curated list of messages based on the match between the virtual token and the service or product based on the CRFT metrics.

5. The computer-implemented method as in claim 1, further comprising periodically updating the CRFT metrics based on additional virtual interactions of the virtual avatar with the service or product.

6. The computer-implemented method as in claim 1, wherein linking the virtual avatar to the user's real-world computing device comprises:
   querying a scrubbing service of a TSP on a blockchain network, comprising:
      communicating the virtual token and at least one virtual interaction with the service or product to the entity; and
      determining that the virtual token is associated with the user that provided consent to link the virtual avatar and the user's real-world computing device anonymously via TSP scrubbing with respect to the service or product.

7. The computer-implemented method as in claim 1, wherein communicating the determination of the match comprises communicating a priority list of users to receive messaging based on CRFT metrics.

8. The computer-implemented method as in claim 7, wherein the CRFT metrics comprise target timing metrics.

9. The computer-implemented method as in claim 1, wherein determining the CRFT metrics further comprises:
   determining a user score based on relative interactions between the virtual avatar and the virtual entity presence based on the recency of virtual interactions, the frequency of virtual interactions, and the timing of virtual interactions.

10. A computer-implemented method as in claim 9, wherein communicating the determination of the match comprises:
   determining that the user score is above a predetermined threshold; and
   notifying an entity associated with the virtual entity presence of the user score above the predetermined threshold.

11. The computer-implemented method as in claim 10, further comprising:
   distributing messaging via a short messaging system to the user's real-world computing device associated with the user score above the predetermined threshold.

12. The computer-implemented method as in claim 1, wherein the user's virtual interaction data further includes user preferences related to receiving promotional messaging, location of the user, and the interaction of the user with the service or product.

13. A computer program product comprising one or more computer readable storage media having program instructions collectively stored on the one or more computer readable storage media, the program instructions executable to:

receive a user's virtual interaction data with a service or product as input from a user, the user's virtual inter-action data comprising data related to usage of the service or product;

link the user's virtual interaction data with the service or product to a virtual token;

determine that the virtual token is associated with the user that provided consent to link a virtual avatar to a user's real-world computing device anonymously via tele-communications service provider (TSP) scrubbing;

link the virtual avatar to the user's real-world computing device;

determine competitive recency, frequency, and time analysis (CRFT) metrics based on the user's virtual interaction data with the service or product via the virtual avatar, wherein to determine the CRFT metrics, the program instructions are executable to:

track recency of virtual interactions between the virtual avatar and a virtual entity presence;

track frequency of virtual interactions between the virtual avatar and the virtual entity presence; and track timing of virtual interactions between the virtual avatar and the virtual entity presence;

determine, based on the CRFT metrics, a match between the virtual token and the service or product; and communicate, to an entity associated with the service or product, a determination of the match between the virtual token and the service or product based on the CRFT metrics.

14. The computer program product as in claim 13, wherein the program instructions are executable to generate a ranked list of messages based on the match between the virtual token and the service or product based on the CRFT metrics.

15. The computer program product as in claim 13, wherein the program instructions are executable to periodi-cally update the CRFT metrics based on additional virtual interactions of the virtual avatar with the service or product.

16. The computer program product as in claim 13, wherein linking the virtual avatar to the user's real-world computing device comprises:

querying a scrubbing service of a TSP on a blockchain network, comprising:

communicating the virtual token and at least one virtual interaction with the service or product to the entity; and determining that the virtual token is associated with the user that provided consent to link the virtual avatar and the user's real-world computing device anony-mously via TSP scrubbing with respect to the service or product.

17. The computer program product as in claim 13, wherein communicating the determination of the match comprises communicating a priority list of users to receive messaging based on CRFT metrics.

18. A system comprising:

a processor set, one or more computer readable storage media, and program instructions collectively stored on the one or more computer readable storage media, the program instructions executable to:

receive a user's virtual interaction data with a service or product as input from a user, the user's virtual interaction data comprising data related to usage of the service or product;

link the user's virtual interaction data with the service or product to a virtual token;

determine that the virtual token is associated with the user that provided consent to link a virtual avatar to a user's real-world computing device anonymously via telecommunications service provider (TSP) scrubbing;

link the virtual avatar to the user's real-world comput-ing device;

determine competitive recency, frequency, and time analysis (CRFT) metrics based on the user's virtual interaction data with the service or product via the virtual avatar, wherein to determine the CRFT met-rics, the program instructions are executable to:

track recency of virtual interactions between the virtual avatar and a virtual entity presence;

track frequency of virtual interactions between the virtual avatar and the virtual entity presence; and track timing of virtual interactions between the virtual avatar and the virtual entity presence;

determine, based on the CRFT metrics, a match between the virtual token and the service or product; and communicate, to an entity associated with the service or product, a determination of the match between the virtual token and the service or product based on the CRFT metrics.

* * * * *